United States Patent [19]

Gallacher et al.

[11] 3,973,326
[45] Aug. 10, 1976

[54] DIRECT READOUT DISTANCE MEASURING DEVICE

[76] Inventors: John David Gallacher, 300 Wildwood Drive SW.; Johann Leopold Nevrkla, 2823 - 31st St. SW.; David Walter Judd, 4216 - 17th St. SW., all of Calgary, Alberta, Canada

[22] Filed: Aug. 7, 1974

[21] Appl. No.: 495,526

[30] Foreign Application Priority Data
Aug. 7, 1973 United Kingdom............37462/73

[52] U.S. Cl. ........................... 33/125 R; 33/1 HH; 33/1 M; 338/195
[51] Int. Cl.²......................................... G01B 7/18
[58] Field of Search .......... 33/1 M, 1 C, 1 HH, 1 R, 33/78, 76 R, 125 R, 143 L, 169 B; 338/195

[56] References Cited
UNITED STATES PATENTS

| | | |
|---|---|---|
| 2,500,605 | 3/1950 | Lange et al..................... 338/195 X |
| 2,713,723 | 7/1955 | Anderson................................ 33/78 |
| 3,024,396 | 3/1962 | Peckjian........................... 33/1 M X |
| 3,058,225 | 10/1962 | Ward................................. 33/169 B |
| 3,477,292 | 11/1969 | Thornton............................. 73/362 |
| 3,648,216 | 3/1972 | Rector........................... 338/195 X |
| 3,702,076 | 11/1972 | Georgi................................. 73/362 |

Primary Examiner—William D. Martin, Jr.
Attorney, Agent, or Firm—Larson, Taylor and Hinds

[57] ABSTRACT

A device for measuring distances is provided wherein, after calibration of the device, a cursor mounted on an elongate movable wand is moved to the point whose distance from a datum point is to be determined. A resistor extends along the length of the wand and an electrical contact on the cursor makes point contact with the resistor. The contact and resistor form a potentiometer whose output varies directly with the position of the cursor. A digital voltmeter connected to the output of the potentiometer provides an indication of the distance measured.

4 Claims, 4 Drawing Figures

DIRECT READOUT DISTANCE MEASURING DEVICE

This invention relates to improvements in direct readout distance measuring devices, and in particular to direct readout devices for accurately reading, plotting and tabulating distances of the order of 0 to 20 inches. The device has specific application in accurately "timing" seismic records and computing cross-sections. In the analysis of seismic records in oil and gas exploration, in which shock wave reflections from underground strata are recorded upon composite sheets for geophysical study, it is necessary to measure accurately distances between a datum line on the sheet and a point or a trace spaced from the datum line. Such measurements require extreme accuracy, since the results indicate the profile of the reflecting surface of the strata, which is normally located several thousand feet below the ground surface, and variations in the profile of a few feet are of significance to the geophysicist in determining the conditions favorable to the accumulation of oil and gas.

Heretofore it has been the practice to employ technicians for such purposes, in order to scale or caliper such distances in inches, and then perform calculations to convert such inch distance measurements into equivalent stratigraphic depths in thousands of feet. Such operations are tedious, time-consuming and susceptible to error, and do not generally, have the extreme accuracy necessary to the interpretation of the results.

Other applications of the device involve well log readings, map scaling of topographic and aerial photography, serial magnetic graphs, navigation and surveying, weather map interpretation and the like, all of which involve a sequence of small measurements requiring high degrees of accuracy. The principal object and essence of the invention is, therefore, to provide a measuring device in which the movement of a cursor along a wand having a datum line will produce linearity in directly read output data. The direct readout measuring device of the invention may be adapted to be electronically coupled to a printer, whereby a direct and permanent record of data is obtained. One direct readout device embodying the invention will now be described by way of example and with reference to the accompanying drawings, in which:

Figure 1:
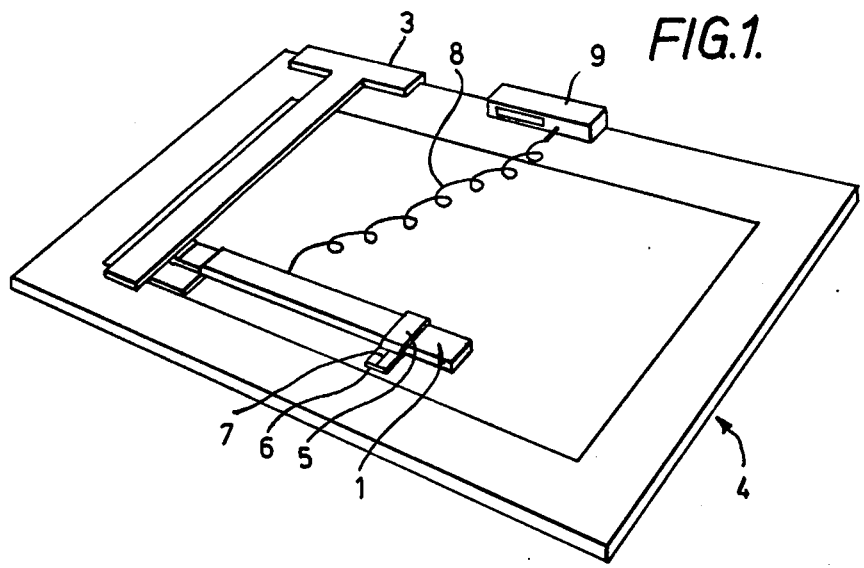
FIG. 1 is a perspective view of the direct readout instrument, assembled for operation.

Referring to FIG. 1, the measuring device depicted comprises a wand 1, pivotally secured at right angles to a T-square 3, moveably secured to a conventional draughting table generally depicted at 4. A cursor 5, slidable on the wand 1, is equipped with a transparent indicator plate 6 having an inscribed hair line 7. Electrically coupled to the wand and cursor by means of a flexible cable 8 is a known digital voltmeter generally designated 9, of high resolution, with integral scalar calibration means. The digital voltmeter will be familiar to those familiar with the field of this invention and since the voltmeter itself forms no part of the invention, a detailed description thereof is not included in this specification.

Figure 2:
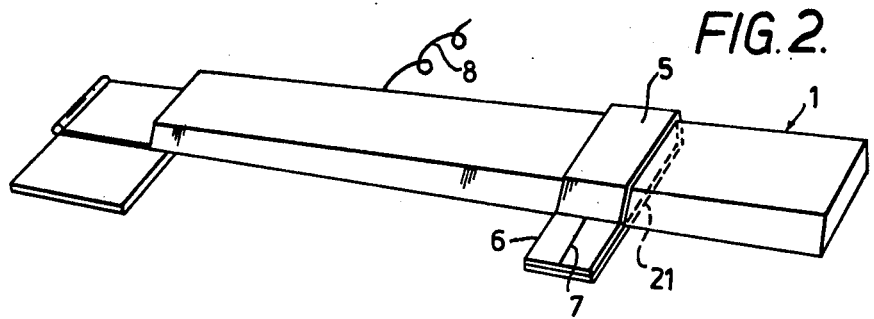
FIG. 2 is an enlarged perspective view of the measuring wand.
Figure 3:
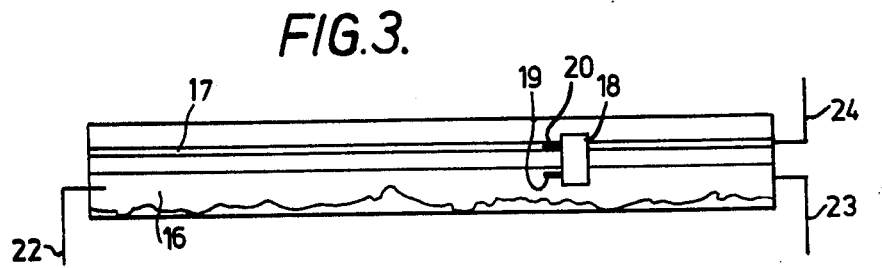
FIG. 3 is a plan view of the resistor strip secured to the underside of the wand, depicting the cursor, resistor and contact strips.

Turning now to the details of the wand 1, reference should be made to FIG. 2 and 3, which depict the wand and its variable electrical resistance means. Secured to the underside of the body of the wand 1 is a strip resistor 16, FIG. 3, having a relatively low resistance over its total length of the order of 1.5 Kohms and in manufacture, is calibrated to be linear with error of less than 0.05 percent. Such linearity is achieved by means of variations in the width of the strip which compensate for the unavoidable variations in the electrical conductivity of the resistor material, which may be comprised of a finely powdered graphite, set in a polymer plastic base, although other suitable materials can be used also.

Spaced parallelly from the resistor strip 16, and electrically insulated therefrom is a metallic conductor strip 17, of essentially negligible resistance relative to the resistor strip 16. A slider contact 18, having a pair of wiper strips 19, 20 is secured to the underside 21 of the cursor 5, FIG. 2. Electrical connections 22, 23, and 24 are made respectively to both ends of the strip resistors 16, and to the conductor strip 17, as depicted in FIG. 3.

Figure 4:
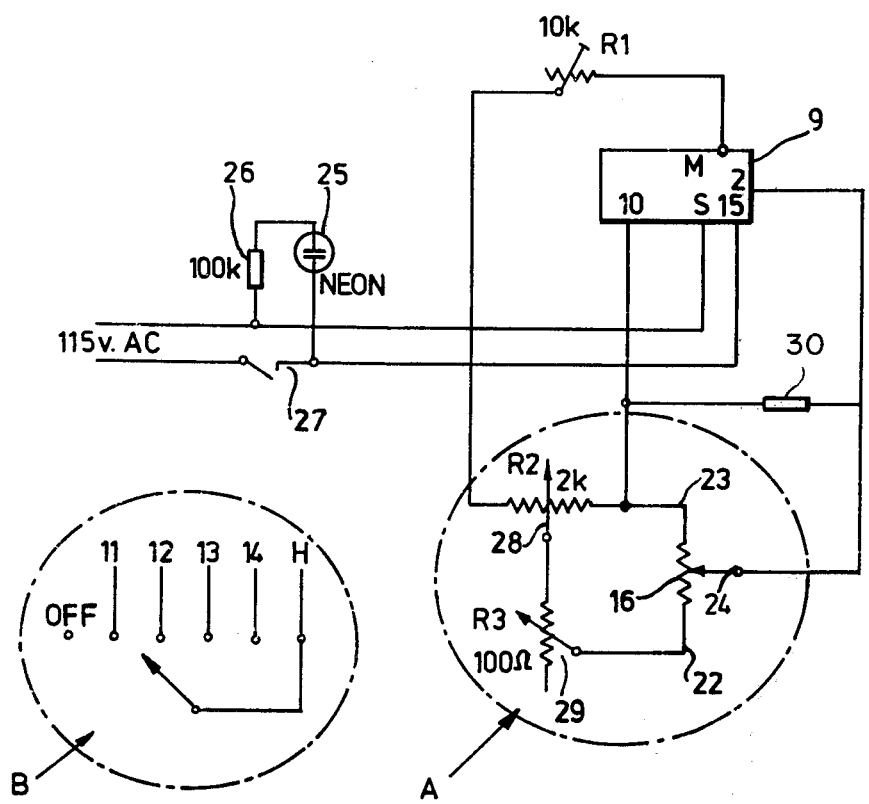
FIG. 4 is a basic circuit diagram suitable for use with the device.

The circuitry of the device, is shown in the circuit diagram of FIG. 4. The digital voltmeter 9 is connected to a 115 v. A. S. power supply through a neon on-off indicator light 25 and 100 Kohm resistor 26 and rocker type two-position switch 27.

The digital voltmeter 9 is desirably 4½ digits, with a full scale reading of 1.9999 volts d.c. The voltmeter 9 provides a constant 5 volts d. c. power supply between meter terminal M, and contact 10, FIG. 4, which voltage energizes the wand circuit A, FIG. 4, which will now be described.

Meter terminal M is connected through trimpot resistor R1, having a value of 10 Kohms to potentiometer R2 in the wand circuit A, which is linear 10-turn, having a resistance of 2 Kohms. The contact arm 28 of potentiometer R2 is connected to a linear signal turn potentiometer R3 of 100 ohm resistance. Contact arm 29 of R3 is connected to one end 22 of strip resistor 16, FIGS. 3 and 4, and opposite end 23 of strip resistor 16 is connected to terminal 23 of potentiometer R2. Cursor contact 24 is connected to pin 2 of the voltmeter 9. Analog input is on pins 10 and 2 of voltmeter 9, and the 115 v. A. C. supply is applied on a meter terminal S and Pin 15. A mter terminal H is connected meter a 5 position rotary switch depicted at B in FIG. 4 which displays a decimal point on the readout; a connection between terminal H and contacts 11, 12, 13, or 14 selectively locates the readout decimal point.

A voltage drop of approximately 3 v. d. c. across R2 can be adjusted through R1, and a voltage of between zero and 3 v. d. c across the strip resistor 16 is applies with contact 28 of R2.

Potentiometer R3 is used for fine adjustment and can accommodate approximately 30 m. v.

Potentiometer R2 is almost linear since the resistance of R3 coupled with 16 will approach 3 Kohms.

It will be appreciated that there is no necessity for a zero adjustment .Balance), since no bridge circuit is used in the device.

A resistor 30, is utilized to set the input impedance at for example, at least 2 meg ohms, and in addition affects the zeroing of the meter 9 when the wand circuit is disconnected.

The circuit of this invention therefore provides a means of reading voltages from the strip resistor 16, without drawing any more than a negligible current through the voltmeter itself. This is accomplished through maintaining a high ratio of voltmeter resistance (2 megohms, or even as high as $10^9$ ohms) to strip resistance (1.5 Kohms).

It will be further appreciated that the digital voltmeter can readily be connected to a known tape printer in order to provide a permanent record of measured date.

The resolution of the device, which is achieved through the linearity of the circuitry, is less than the errors introduced by the operator, and it will be appreciated, therefore, that the apparatus of this invention provides a means of accurately measuring small finite distances, and applying scalar interpretation thereto, coupled to direct readout devices, with minimum exposure to errors of interpretation or calculation.

Many other modifications in the apparatus may occur to those skilled in the art without departing from the scope of the invention.

What is claimed is:

1. Apparatus for measuring the distance between a datum point and one or more further points comprising
    an elongate member;
    a cursor attached to said elongate member so as to slide along said elongate member, the position of said cursor providing an indication of the distance between the point at where said cursor is positioned and said datum point,
    a resistor, having two end terminals, affixed to said elongate member and extending along the length of said elongate member, said resisor being calibrated to have an uniform resistance per unit length between the end terminals thereof,
    a constant voltage supply connected to the two end terminals of said resistor,
    said cursor having an electrical contact for contacting said resistor at a point so as to form a potentiometer with said resistor and said supply, the output of said potentiometer varying directly with the position of said cursor, and voltage detector means connected to the output of potentiometer to provide an indication representative of the distance between said datum point and the position of said cursor, said detector means comprising a digital voltmeter providing a digital readout, said voltmeter being connected to the output of said potentiometer and providing a high impedance relative to that of said resistor.

2. Apparatus as claimed in claim 1 wherein said apparatus for measuring distances includes a conductive strip affixed to said elongate member so as to form an electrical contact for said sliding cursor.

3. Apparatus as claimed in claim 1 wherein said resistor is a strip having variations in the width of said strip so as to compensate for non-uniformities in the resistance of said strip.

4. Apparatus as claimed in claim 1 further comprising means for calibrating said apparatus including a first circuit connected across two terminals of said voltmeter and including at least one variable resistance device, including an adjustment tap, connected therein and a second, fine adjustment circuit connected to the adjustment tap of said variable resistance device across said potentiometer.

* * * * *